United States Patent
Hoshino et al.

(10) Patent No.: US 9,145,888 B2
(45) Date of Patent: Sep. 29, 2015

(54) DIFFERENTIAL PRESSURE CONTROL VALVE AND VARIABLE DISPLACEMENT COMPRESSOR HAVING THE DIFFERENTIAL PRESSURE CONTROL VALVE

(75) Inventors: Nobuaki Hoshino, Kariya (JP); Masaki Ota, Kariya (JP); Yoshio Kimoto, Kariya (JP); Toru Onishi, Kariya (JP); Yusuke Yamazaki, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 253 days.

(21) Appl. No.: 13/302,558

(22) Filed: Nov. 22, 2011

(65) Prior Publication Data
US 2012/0134854 A1 May 31, 2012

(30) Foreign Application Priority Data
Nov. 25, 2010 (JP) ................. 2010-261876

(51) Int. Cl.
*F04B 49/03* (2006.01)
*F04B 49/22* (2006.01)
(Continued)

(52) U.S. Cl.
CPC ........... *F04B 49/225* (2013.01); *F04B 11/0091* (2013.01); *F04B 27/1804* (2013.01); *F04B 27/22* (2013.01); *F04B 53/1082* (2013.01); *F16K 15/028* (2013.01); *F16K 31/084* (2013.01)

(58) Field of Classification Search
CPC .... F04B 27/1802; F04B 49/08; F04B 49/225; F04B 53/1022; F04B 53/1025; F04B 53/1027; F04B 53/103; F04B 53/1032; F04B 53/1035; F04B 53/1082; F04B 53/1085; F04B 53/1087; F16K 15/028

USPC ....................................... 251/65, 73
See application file for complete search history.

(56) References Cited

U.S. PATENT DOCUMENTS 2,949,931 A * 8/1960 Ruppright ............... 137/528
4,275,759 A * 6/1981 Huang .................... 137/528
(Continued)

FOREIGN PATENT DOCUMENTS

CN 1266946 A 9/2000
CN 1707108 A 12/2005
(Continued)

OTHER PUBLICATIONS

European Search Report of EP 11 19 0053.6 dated Apr. 5, 2012.
(Continued)

*Primary Examiner* — Bryan Lettman
*Assistant Examiner* — Charles W Nichols
(74) *Attorney, Agent, or Firm* — Sughrue Mion, PLLC

(57) ABSTRACT

A differential pressure control valve has a valve seat made of magnetic material, a valve body, and a guiding member fixed to the valve seat to guide the valve body. The valve body is located on the downstream side of the valve seat, and is seatable on the valve seat in accordance with the pressure difference between the upstream side and the downstream side to selectively open and close a valve hole. The valve body has a lid made of magnetic material and a guided member made of nonmagnetic material. The lid is seated on the valve seat to close the valve hole, and the guided member is guided by the guiding member. The valve seat or the lid has a permanent magnet, located outside the area where the valve body is seated on the valve seat, urging the valve body in the direction approaching the valve seat.

7 Claims, 8 Drawing Sheets

(51) Int. Cl.
*F16K 15/02* (2006.01)
*F04B 11/00* (2006.01)
*F04B 27/18* (2006.01)
*F04B 27/22* (2006.01)
*F04B 53/10* (2006.01)
*F16K 31/08* (2006.01)

(56) References Cited

U.S. PATENT DOCUMENTS

| | | | |
|---|---|---|---|
| 4,808,089 A | 2/1989 | Buchholtz et al. | |
| 5,758,863 A * | 6/1998 | Buffet et al. | 251/28 |
| 6,352,416 B1 | 3/2002 | Ota et al. | |
| 6,408,913 B1 * | 6/2002 | Caretta et al. | 152/415 |
| 6,755,114 B2 * | 6/2004 | Onoe | 91/275 |
| 6,935,364 B1 * | 8/2005 | Tarazona et al. | 137/529 |
| 2004/0062660 A1 | 4/2004 | Kazahaya et al. | |
| 2005/0276700 A1 | 12/2005 | Hirota | |
| 2007/0214814 A1 * | 9/2007 | Umemura et al. | 62/228.1 |
| 2011/0253918 A1 * | 10/2011 | Rampen et al. | 251/65 |

FOREIGN PATENT DOCUMENTS

| | | |
|---|---|---|
| DE | 10 2006 006 627 B3 | 7/2007 |
| EP | 1 096 188 A2 | 5/2001 |
| GB | 2 416 822 A | 2/2006 |
| JP | 2000-055223 A | 2/2000 |
| WO | 2008/011240 A2 | 1/2008 |

OTHER PUBLICATIONS

Chinese Office Action dated Sep. 4, 2013 issued in corresponding Chinese Application No. 201110373300.0.

* cited by examiner

DIFFERENTIAL PRESSURE CONTROL VALVE AND VARIABLE DISPLACEMENT COMPRESSOR HAVING THE DIFFERENTIAL PRESSURE CONTROL VALVE

BACKGROUND OF THE INVENTION

The present invention relates to a differential pressure control valve and a variable displacement compressor having same.

Japanese Laid-Open Patent Publication No. 2000-55223 discloses four examples of conventional differential pressure control valves. These differential pressure control valves are arranged in a flow passage that allows fluids from the upstream side to the downstream side with respect to the differential pressure control valve. Each differential pressure control valve has a valve seat, a valve body, and a guiding member. A valve hole through which fluid passes is formed in the valve seat. The valve body is located on the downstream side of the valve seat, and separates from or is seated on the valve seat in accordance with the pressure difference between the upstream side and the downstream side to open or close the valve hole. The guiding member is fixed to the valve seat to guide the valve body. In these differential pressure control valves, one of the valve seat and the valve body is made of magnetic material, and the other is made of a permanent magnet.

In these differential pressure control valves, when the valve hole is closed, the valve body remains seated on the valve seat due to the magnetic sticking force acting between the permanent magnet and the magnetic material. When the valve hole is opened, the valve body is urged toward the valve seat due to a magnetic pulling force (magnetic attraction) acting between the permanent magnet and the magnetic material.

In a general differential pressure control valve, which urges the valve body toward the valve seat using only a spring, the urging force of the spring increases as the distance of the valve body from the valve seat increases. In contrast, in the differential pressure control valve disclosed in Japanese Laid-Open Patent Publication No. 2000-55223, the magnetic pulling force of the permanent magnet decreases as the distance between the valve body and the valve seat increases. Thus, compared to a general differential pressure control valve, the valve seat is easily separated from the valve seat when the valve hole is opened. Therefore, even when the pressures difference is small, the differential pressure control valve of the publication reliably opens the valve hole to reduce the pressure loss when fluid flows from the upstream side to the downstream side via the valve hole.

However, in each differential pressure control valve of Japanese Laid-Open Patent Publication No. 2000-55223, the valve seat or the valve body is entirely made of a permanent magnet. Therefore, when the valve hole is closed, the permanent magnet collides with the magnetic material and is likely to be cracked.

In this respect, Japanese Laid-Open Patent Publication No. 2000-55223 discloses three modifications of differential pressure control valves. In these differential pressure control valves, a valve seat or a valve body that has a permanent magnet coated with resin is used. Since the resin alleviates the impact of collision between the permanent magnet and the magnetic material when the valve hole is closed, the permanent magnet is prevented from being cracked. This improves the durability of the differential pressure control valves.

However, in the differential pressure control valves according to the modified embodiments of Japanese Laid-Open Patent Publication No. 2000-55223, the resin exits between the permanent magnet and the magnetic material not only when the valve seat is seated on the valve seat, but also when the valve body is urged toward the valve seat. Since this hinders the flow of magnetic flux from the permanent magnet to the magnetic material, which reduces the magnetic flux density between the valve body and the valve seat. Accordingly, in these differential pressure control valves, the magnetic force acting between the valve body and the valve seat is relatively weak. This hinders the movement of the valve body toward the valve seat and prevents the valve body from being stably seated on the valve seat.

To solve the above problem, the permanent magnet may be, for example, increased in size without changing the type thereof. However, in this case, the permanent magnet is bulky and requires a relatively large space in the differential pressure control valve. This makes it difficult for the differential pressure control valve to be reduced in size. As a result, the variable displacement compressor having the differential pressure control valve is difficult to reduce in size.

SUMMARY OF THE INVENTION

Accordingly, it is an objective of the present invention to provide a differential pressure control valve and a variable displacement compressor having the differential pressure control valve that have improved durability and reduced sizes, and are capable of reducing pressure loss.

To achive the foregiong objective and in accordance with one aspect of the present invention, a differential pressure control valve is provided that includes a valve seat, a valve body, and a guiding member. The valve seat has a valve hole through which fluid passes. The valve body is located downstream of the valve seat. The valve body separates from or is seated on the valve seat in accordance with the pressure difference between the upstream side and the downstream side, thereby opening or closing the valve hole. The guiding member is fixed to the valve seat to guide the valve body. The valve seat is made of magnetic material. The valve body has a lid made of magnetic material and a guided member made of nonmagnetic material. The lid is seatable on the valve seat to close the valve hole, and the guided member is guided by the guiding member. One of the valve seat and the lid has a permanent magnet. The valve body is urged in the direction approaching the valve seat by the magnetic pulling force of the permanent magnet. The permanent magnet is located at a position outside an area in which the valve body is seated on the valve seat.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First to third embodiments of the present invention will now be described with reference to the drawings.
(First Embodiment)

Figure 1:
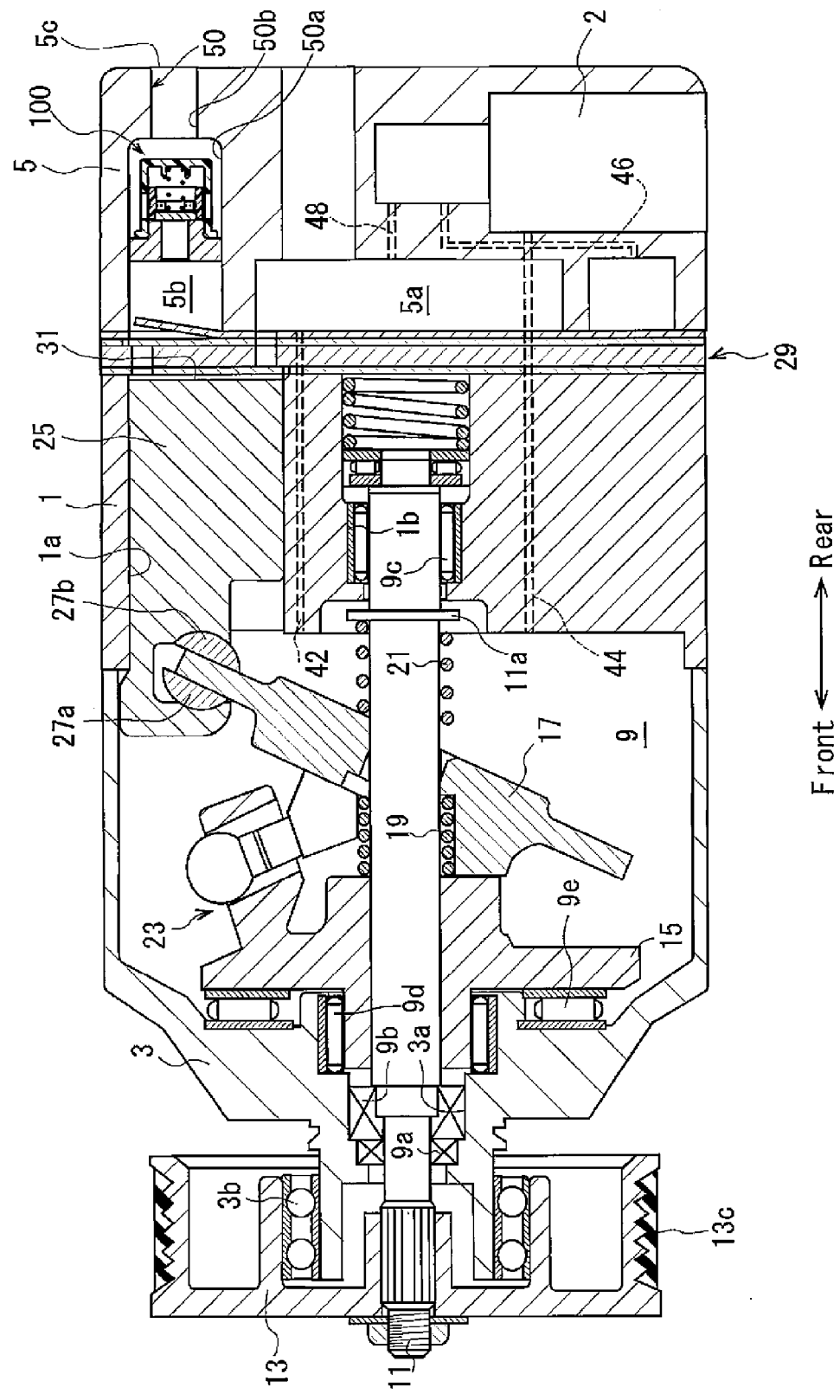
FIG. 1 is a cross-sectional side view illustrating a variable displacement compressor having a differential pressure control valve according to a first embodiment of the present invention.

As shown in FIG. 1, a differential pressure control valve 100 of a first embodiment functions as a check valve incorporated in a swash plate type variable displacement compressor (hereinafter, simply referred to as a compressor). The compressor includes a cylinder block 1, in which a plurality of parallel cylinder bores 1a are formed along a common circumference and at equal angular intervals. The compressor further includes a front housing member 3 and a rear housing member 5, which are located forward of and rearward of the cylinder block 1, respectively. The cylinder block 1 is held between the front housing member 3 and the rear housing member 5 and is secured to the front housing member 3 and the rear housing member 5 in this state. A crank chamber 9 is formed inside the cylinder block 1 and the front housing member 3. In this description, the left side of the sheet of FIG. 1 is referred to as the front side, while the right side of the sheet is referred to as the rear side. The same applies to FIGS. 2 and 4 to 8.

A shaft hole 3a is formed in the front housing member 3, and a shaft hole 1b is formed in the cylinder block 1. A shaft sealing device 9a and a bearing device 9b are provided in the shaft hole 3a. A bearing device 9c is provided in the shaft hole 1b. A drive shaft 11 extends through the shaft holes 3a, 1b, and is rotatably supported by the front housing member 3 and the cylinder block 1 via the shaft sealing device 9a and the bearing devices 9b, 9c. A pulley 13 is rotatably supported by the front housing member 3 via a bearing device 3b and is fixed to the drive shaft 11. A belt 13c, which is driven by an engine or motor of a vehicle, is engaged with the pulley 13. The pulley 13 may be replaced by an electromagnetic clutch.

A lug plate 15 is fitted about the drive shaft 11 in the crank chamber 9. Bearing devices 9d, 9e are located between the lug plate 15 and the front housing member 3. The drive shaft 11 extends through a swash plate 17. An inclination angle decreasing spring 19 is provided between the lug plate 15 and the swash plate 17 and about the drive shaft 11. The inclination angle decreasing spring 19 urges the swash plate 17 in a direction decreasing the inclination angle of the swash plate 17. A snap ring 11a is fixed to a part of the drive shaft 11 close to the rear end. A returning spring 21 is located between the snap ring 11a and the swash plate 17 and about the drive shaft 11. The returning spring 21 urges the swash plate 17 in a direction opposite to direction in which the inclination angle decreasing spring 19 urges the swash plate 17. The lug plate 15 and the swash plate 17 are connected to each other by a link mechanism 23, which supports the swash plate 17 while allowing the inclination of the swash plate 17 to be variable.

A reciprocating piston 25 is accommodated in each cylinder bore 1a. A pair of front and rear shoes 27a, 27b are provided between each piston 25 and the swash plate 17. The pairs of the shoes 27a, 27b convert rotation of the swash plate 17 into reciprocation of the pistons 25.

A valve unit 29 is located between the cylinder block 1 and the rear housing member 5. In each cylinder bore 1a, a compression chamber 31 is formed between the piston 25 and the valve unit 29. A suction chamber 5a, which is located radially inward, and a discharge chamber 5b, which is located radially outward, are formed in the rear housing 5. Refrigerant gas, which serves as a fluid for heat exchange, is supplied to the suction chamber 5a.

When the piston 25 is in the suction stroke, refrigerant gas in the suction chamber 5a is drawn into the compression chamber 31 through the valve unit 29. When the piston 25 is in the discharge stroke, the refrigerant gas in the compression chamber 31 is compressed and discharged to the discharge chamber 5b through the valve unit 29.

The crank chamber 9 and the suction chamber 5a are connected to each other by a bleed passage 42. The crank chamber 9 and the discharge chamber 5b are connected to each other by supply passages 44, 46. A displacement control valve 2 is accommodated in the rear housing 5. The displacement control valve 2 is connected to the suction chamber 5a by a pressure introduction passage 48, and is connected to the crank chamber 9 and the discharge chamber 5b by the supply passages 44, 46.

When in operation, the displacement control valve 2 changes the opening amount of the supply passages 44, 46 based, for example, on the pressure detected via the pressure introduction passage 48 (the pressure in the suction chamber 5a, that is, the suction pressure). This changes the amount of refrigerant gas supplied from the discharge chamber 5b to the crank chamber 9 via the supply passages 44, 46, so that the pressure in the crank chamber 9 is adjusted to a desired pressure. As a result, the inclination angle of the swash plate 17 is changed, so that the displacement of the compressor is changed to a desired value.

A discharge passage 50 is formed in the rear housing member 5. The discharge passage 50 communicates with the discharge chamber 5b and has an opening 5c located in the rear surface of the rear housing member 5. When the compressor is installed in a vehicle air conditioner, the opening 5c is connected to a condenser (not shown).

Figure 2:
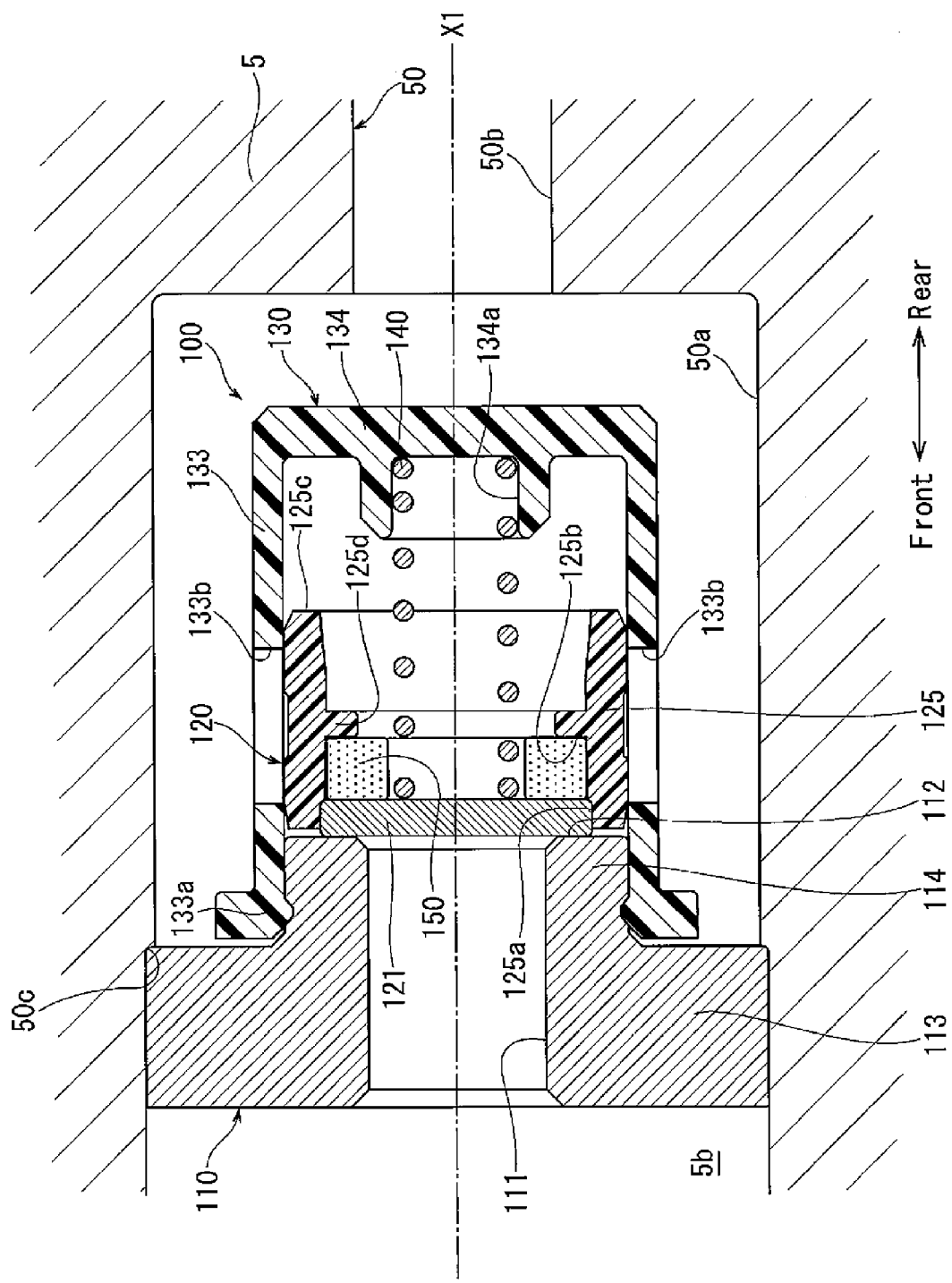
FIG. 2 is a cross-sectional view of the differential pressure control valve shown in FIG. 1.

As shown in FIG. 2 in an enlarged manner, the discharge passage 50 has a large diameter portion 50a and a small diameter portion 50b. The centers of the large and small diameter portions 50a, 50b coincides with an axis X1 that is parallel with the front-rear direction. The large diameter portion 50a is formed by recessing rearward the inner wall of the discharge chamber 5b, and the small diameter portion 50b connects the large diameter portion 50a to the opening 5c (FIG. 1). The differential pressure control valve 100 is arranged in the large diameter portion 50a.

The differential pressure control valve 100 has a valve seat 110, a valve body 120, a guiding member 130, and a spring 140. The valve seat 110, the valve body 120, the guiding member 130, and the spring 140 are assembled to be unitized and form the differential pressure control valve 100. The differential pressure control valve 100 is inserted into the large diameter portion 50a through the discharge chamber 5b such that the valve seat 110 contacts a step 50c and is prevented from coming off, for example, by a snap ring (not shown). In this manner, the differential pressure control valve 100 is fixed in the rear housing member 5 while separating the discharge chamber 5b and the discharge passage 50 from each other. The discharge chamber 5b is located upstream of the discharge passage 50. A portion of the large diameter portion 50a that is on the opposite side of the valve seat 110 to the discharge chamber 5b is a downstream portion of the discharge passage 50.

The valve seat 110 includes a base 113 and a cylindrical portion 114 located rearward of the base 113. The base 113 is shaped as a thick disk the center of which is the axis X1. The cylindrical portion 114 that is coaxial with the base 113 has a smaller diameter than the base 113. In this embodiment, the valve seat 110 is made of iron (for example, S45C), which is magnetic material.

A valve hole 111, the center of which is the axis X1, is formed through the base 113 and the cylindrical portion 114. The valve hole 111 connects the discharge chamber 5b to the downstream portion of the discharge passage 50. As described below, the differential pressure control valve 100 opens or closes the valve hole 111 in accordance with the pressure difference between the discharge chamber 5b or the upstream portion of the discharge passage 50 and the discharge passage 50. The end face of the cylindrical portion 114 that is located about the valve hole 111 and faces rearward is a flat seating face 112. The seating face 112 is parallel with a plane perpendicular to the axis X1.

The guiding member 130 has a cylindrical portion 133, the center of which is the axis X1, and a disk portion 134 that closes the rear end of the cylindrical portion 133. In this embodiment, the guiding member 130 is made of resin, which is nonmagnetic material (for example, nylon resin). A front end 133a of the cylindrical portion 133 is fitted from the outside to the outer circumferential surface of the cylindrical portion 114. The guiding member 130 is thus fixed to the valve seat 110.

The cylindrical portion 133 has a plurality of windows 133b, which are located at a middle portion of the cylindrical portion 133 in the front-rear direction and aligned along the circumference about the axis X1. The windows 133b connect the interior of the cylindrical portion 133 to the outside.

The valve body 120 is accommodated in the space surrounded by the cylindrical portion114 of the valve seat 110 and the guiding member 130, and is located downstream of the valve seat 110 in the discharge passage 50. The valve body 120 has a lid 121 and a guided member 125.

The lid 121 is shaped as a thin disk the center of which is the axis X1 and faces the seating face 112. In this embodiment, the lid 121 is made of iron (for example, S45C), which is a magnetic material.

The guided member 125 is shaped as a cylinder the center of which is the axis X1. A front opening 125a of the guided member 125 is fitted from outside to the outer edge of the lid 121. Accordingly, the guided member 125 and the lid 121 are integrated. In this embodiment, the guided member 125 is made of resin, which is nonmagnetic material (for example, nylon resin).

A clearance exists between the outer circumferential surface of the guided member 125 and the inner circumferential surface of the cylindrical portion 133 to allow the guided member 125 to slide forward and rearward. Accordingly, the valve body 120 can be displaced forward and backward while being guided by the guiding member 130. When the valve body 120 is displaced forward and contacts the seating face 112, the valve body 120 is seated on the valve seat 110 and closes the valve hole 111. In this state, the guided member 125 closes the windows 133b of the cylindrical portion 133. If the valve body 120 is displaced rearward from this state, the valve body 120 separates from the valve seat 110 to open the valve hole 111. In this state, the guided member 125 opens the windows 133b. When the valve body 120 is moved further rearward, and a rear end 125c of the guided member 125 contacts the disk portion 134, the valve hole 111 is fully opened. In this state, the guided member 125 fully opens the windows 133b.

An inner flange 125d is formed on the inner circumferential surface of the guided member 125 at a middle position in the front-rear direction. The inner flange 125d protrudes toward the axis X1. A holding space 125b for holding a permanent magnet 150 is formed between the inner flange 125d and the lid 121.

The permanent magnet 150 is annular and its center is the axis X1, and is stuck to the lid 121 due to its own magnetic force. When the permanent magnet 150 is inserted into the holding space 125b through the opening 125a, the lid 121 is fitted into the opening 125a. This holds the permanent magnet 150 in the holding space 125b. The permanent magnet 150 is located on the opposite side of the lid 121 in relation to the valve seat 110. That is, the permanent magnet 150 is installed in a position that is away from (outside the area) the area in which the valve body 120 is seated on or separates from the valve seat 110. The permanent magnet 150 therefore does not contact the valve seat 110.

In this embodiment, the permanent magnet 150 is a samarium-cobalt magnet. The magnetic force of a samarium-cobalt magnet is slightly weaker than that of a neodymium magnet. However, the rate of change of the magnetic force of a samarium-cobalt magnet in relation to temperature, that is, the rate of decrease of the magnetic force in relation to increase in temperature is smaller than that of a neodymium magnet. Thus, a samarium-cobalt magnet has a superior heat resistance. Further, a samarium-cobalt magnet resists rust. Therefore, a samarium-cobalt magnet is suitable for the differential pressure control valve 100, which is used in a vehicle air conditioner and is exposed to high-temperature refrigerant gas.

The spring 140 is located between the valve body 120 and the guiding member 130. The front end of the spring 140 contacts the lid 121, and the rear end of the spring 140 is inserted in a spring holding portion 134a formed in the disk portion 134. Compared to a spring used in a general differential pressure control valve, in which the valve body is urged toward the valve seat only by the urging force of the spring, the spring 140 is a small spring having a very small urging force. In this embodiment, the spring 140 is made of SUS316, which is nonmagnetic material.

Figure 3:
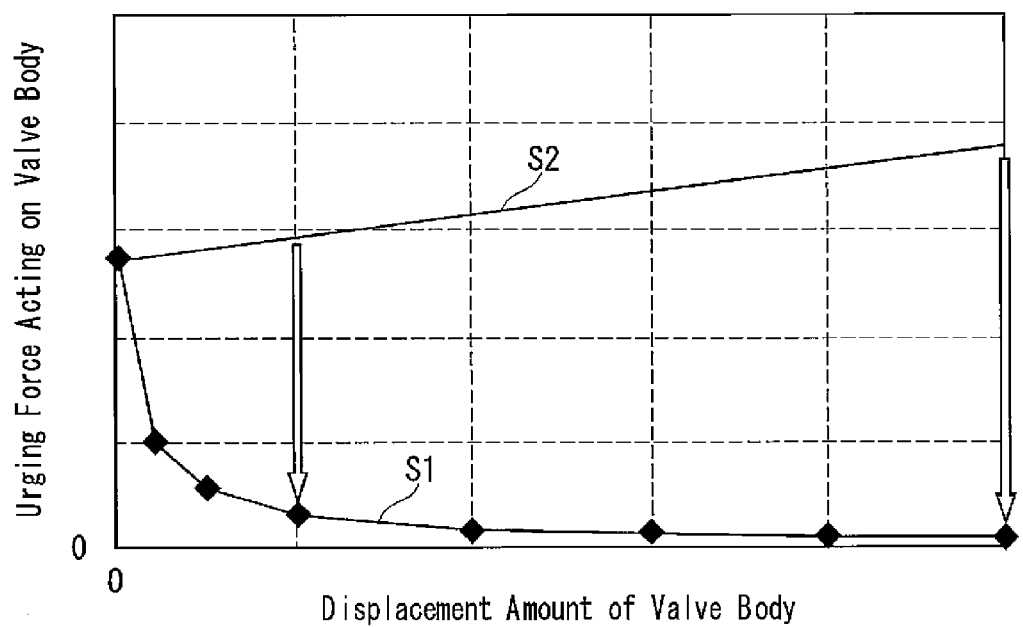
FIG. 3 is a graph showing the relationship between the displacement amount of the valve body and urging force acting on the valve body in the differential pressure control valve shown in FIG. 1.

FIG. 3 shows the relationship between the amount of displacement of the valve body 120 and a force urging the valve body 120 toward the valve seat 110 using solid lines S1, S2. Solid line S1 represents the relationship between the amount of displacement of the valve body 120 and the magnetic force acting between the permanent magnet 150 and the valve seat 110. In this description, the magnetic force acting between the permanent magnet 150 and the valve seat 110 is referred to as a magnetic sticking force when the amount of displacement of the valve body 120 is equal to zero (when the valve body 120 is in contact with the valve seat 110). The magnetic force is referred to as a magnetic pulling force when the amount of displacement of the valve body 120 is greater than zero (when the valve body 120 is separated from the valve seat 110).

Solid line S2 shows an example of an urging force in a case of a general differential pressure control valve in which a valve body is urged toward a valve seat only by urging force of a spring. This example represents a differential pressure control valve that is obtained by removing the permanent magnet 150 from the differential pressure control valve 100 and replacing the spring 140 by a spring having a strong urging force.

In the case of the first embodiment, when the valve hole 111 is closed, that is, when the amount of displacement of the valve body 120 is zero, as represented by solid line S1, the magnetic sticking force acting between the permanent magnet 150 and the valve seat 110 is set to maintain contact between the valve seat 110 and the valve body 120 as long as the pressure difference between the discharge chamber 5b and the downstream side of the discharge passage 50 is less than or equal to a predetermined value ΔP. Also, as represented by solid line S2, the magnetic sticking force is equal to the force applied by the spring of a general differential pressure control valve that urges the valve body 120 toward the valve seat 110 when the valve hole 111 is closed.

On the other hand, in a case of a general differential pressure control valve, when the valve hole 111 is opened, that is, when the amount of displacement of the valve body 120 is greater than zero, the force with which the spring urges the valve body 120 toward the valve seat 110 is proportionally increased as represented by solid line S2.

In contrast, in a case of the first embodiment, when the valve hole 111 is opened, that is, when the amount of displacement of the valve body 120 is greater than zero, the force acting between the permanent magnet 150 and the valve seat 110 sharply drops as represented by solid line S1.

When the compressor as described above is installed in a vehicle air conditioner, the discharge chamber 5b is connected to the condenser (not shown) via the discharge passage 50. The condenser is connected to an evaporator via an expansion valve, and the evaporator is connected to the suction chamber 5a. When the drive shaft 11 is rotated, for example, by an engine, the compressor introduces refrigerant gas from the suction chamber 5a to the compression chambers 31 to compress the refrigerant gas, and discharges the compressed refrigerant gas the displacement of which corresponds to the inclination angle of the swash plate 17, to the discharge chamber 5b.

During this time, the displacement control valve 2 is operated in accordance with a command for changing the temperature of air conditioning by an occupant or the speed of, for example, the vehicle engine. When the amount of refrigerant gas that is supplied from the discharge chamber 5b to the crank chamber 9 via the supply passages 44, 46 is reduced, the inclination angle of the swash plate 17 is increased, which increases the displacement. In contrast, when the amount of refrigerant gas that is supplied from the discharge chamber 5b to the crank chamber 9 via the supply passages 44, 46 is increased, the inclination angle of the swash plate 17 is reduced, which reduces the displacement. Accordingly, the displacement of the compressor is changed as necessary.

The differential pressure control valve 100 operates in the following manner. When the inclination angle of the swash plate 17 is minimized and the volume of refrigerant gas discharged from the discharge chamber 5b (displacement) is minimized, the pressure difference between the discharge chamber 5b and the downstream portion of the discharge passage 50 becomes less than or equal to a predetermined pressure ΔP. Then, the valve body 120 is moved toward the valve seat 110 (that is, in the direction approaching the valve seat 110) by the magnetic pulling force acting between the permanent magnet 150 and the valve seat 110 and a weak urging force of the spring 140 as shown in FIG. 2. The valve body 120 is eventually seated on the valve seat 110, so that the lid 121 closes the valve hole 111. This state is maintained by the magnetic sticking force acting between the permanent magnet 150 and the valve seat 110. As a result, the discharge passage 50 is closed, so that circulation of refrigerant through the compressor, the condenser, the expansion valve, and the evaporator is stopped. This prevents refrigerant gas from flowing backward from the discharge passage 50 to the discharge chamber 5b. That is, the differential pressure control valve 100 functions as a check valve.

On the other hand, when the inclination angle of the swash plate 17 is increased from the minimum inclination angle, the displacement is increased accordingly, and the pressure difference between the discharge chamber 5b and the downstream portion of the discharge passage 50 exceeds a predetermined value ΔP. Then, the force produced by the pressure difference exceeds the magnetic sticking force acting between the permanent magnet 150 and the valve seat 110, and the lid 121 can no longer keep closing the valve hole 111. As a result, the valve body 120 is separated from the valve seat 110 while being guided by the guiding member 130. Since the magnetic pulling force acting between the permanent magnet 150 and the valve seat 110 sharply drops as represented by solid line S1, the lid 121 is pushed further by the refrigerant gas flowing through the valve hole 111. Therefore, the valve body 120 is largely separated from the valve seat 110, so that the guided member 125 opens the windows 133b. As a result, the discharge passage 50 is quickly switched to the fully opened state, so that refrigerant gas discharged from the compression chambers 31 to the discharge chamber 5b flows to the discharge passage 50. This starts circulation of refrigerant through the compressor, the condenser, the expansion valve, and the evaporator.

The differential pressure control valve 100 according to the first embodiment has the permanent magnet 150. As represented by solid lines S1, S2 in FIG. 3, the magnetic pulling force of the permanent magnet 150 is weakened as the valve body 120 is separated further away from the valve seat 110. Thus, compared to a general differential pressure control valve, the valve body 120 is easily separated from the valve seat 110 when the valve hole 111 is opened. Therefore, even if the pressure difference between the discharge chamber 5b and the downstream portion of the discharge passage 50 is small, the differential pressure control valve 100 reliably opens the valve hole 111, thereby reducing the pressure loss when refrigerant gas flows from the discharge chamber 5b to the downstream portion of the discharge passage 50 via the valve hole 111.

Also, according to the differential pressure control valve 100, the permanent magnet 150 located in the lid 121 is installed in a position that is away from the area in which the valve body 120 is seated on or separates from the valve seat 110. Since the permanent magnet 150 does not contact the valve seat 110, the permanent magnet 150 does not collide with the valve seat 110 when the valve hole 111 is closed. As a result, the permanent magnet 150 is prevented from being cracked, and the durability of the differential pressure control valve 100 is improved.

Figure 4:
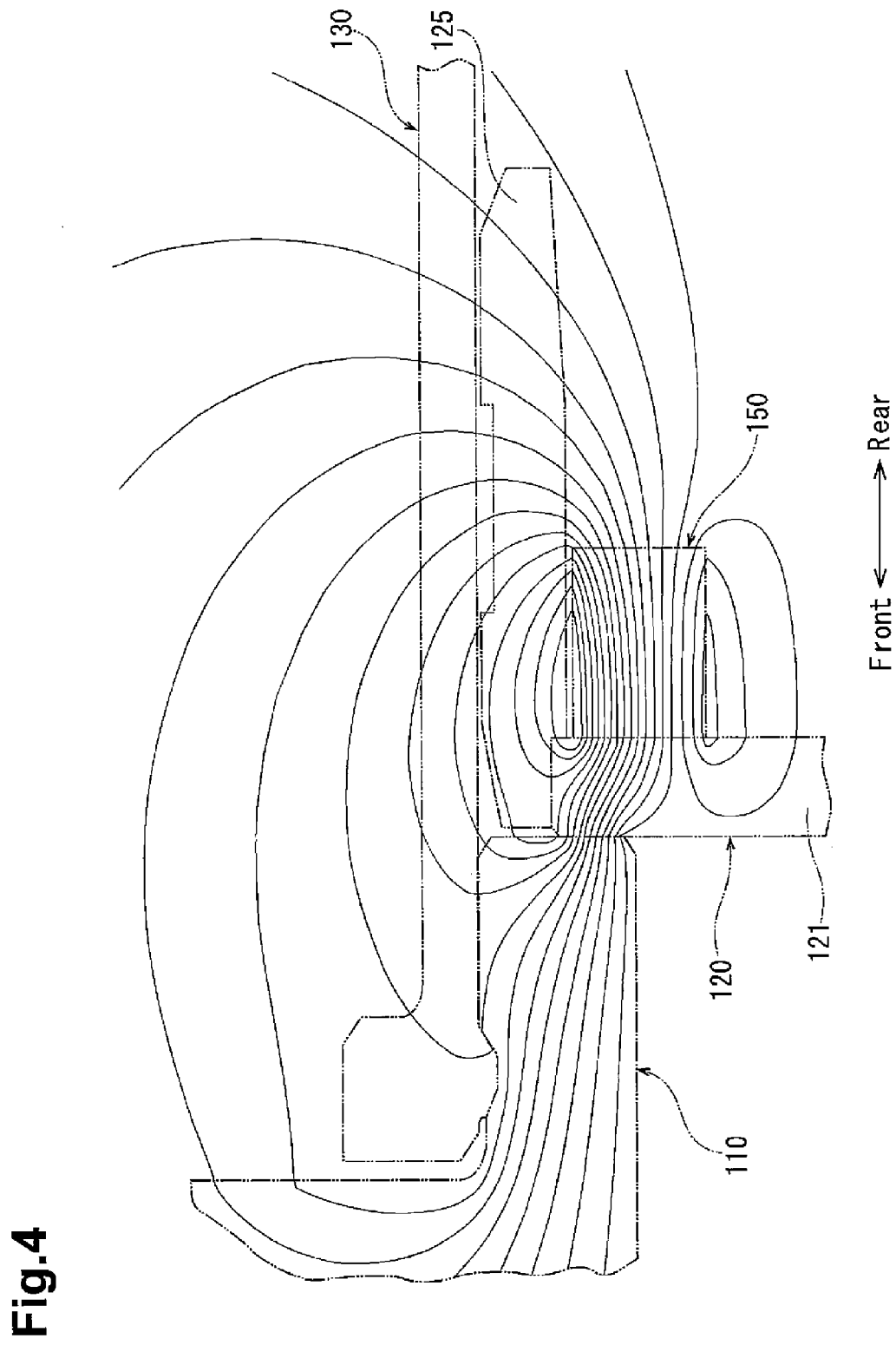
FIG. 4 is a diagram showing magnetic flux lines of the permanent magnet in the differential pressure control valve shown in FIG. 1.

Further, according to the differential pressure control valve 100, the valve seat 110 and the lid 121 are made of magnetic material, and the guiding member 130 and the guided member 125 are made of nonmagnetic material. Therefore, as shown in FIG. 4, the magnetic flux of the permanent magnet 150 does not smoothly flow from the lid 121 toward the guiding member 130 and the guided member 125, while smoothly flowing from the lid 121 toward the valve seat 110. This further increases the magnetic flux density between the lid 121 and the valve seat 110. In FIG. 4, phantom lines (two-dot chain lines) represent parts of the valve seat 110, the valve body 120, the guiding member 130, and the permanent magnet 150, and curves (solid lines) represent magnetic flux of the permanent magnet 150.

Figure 5:
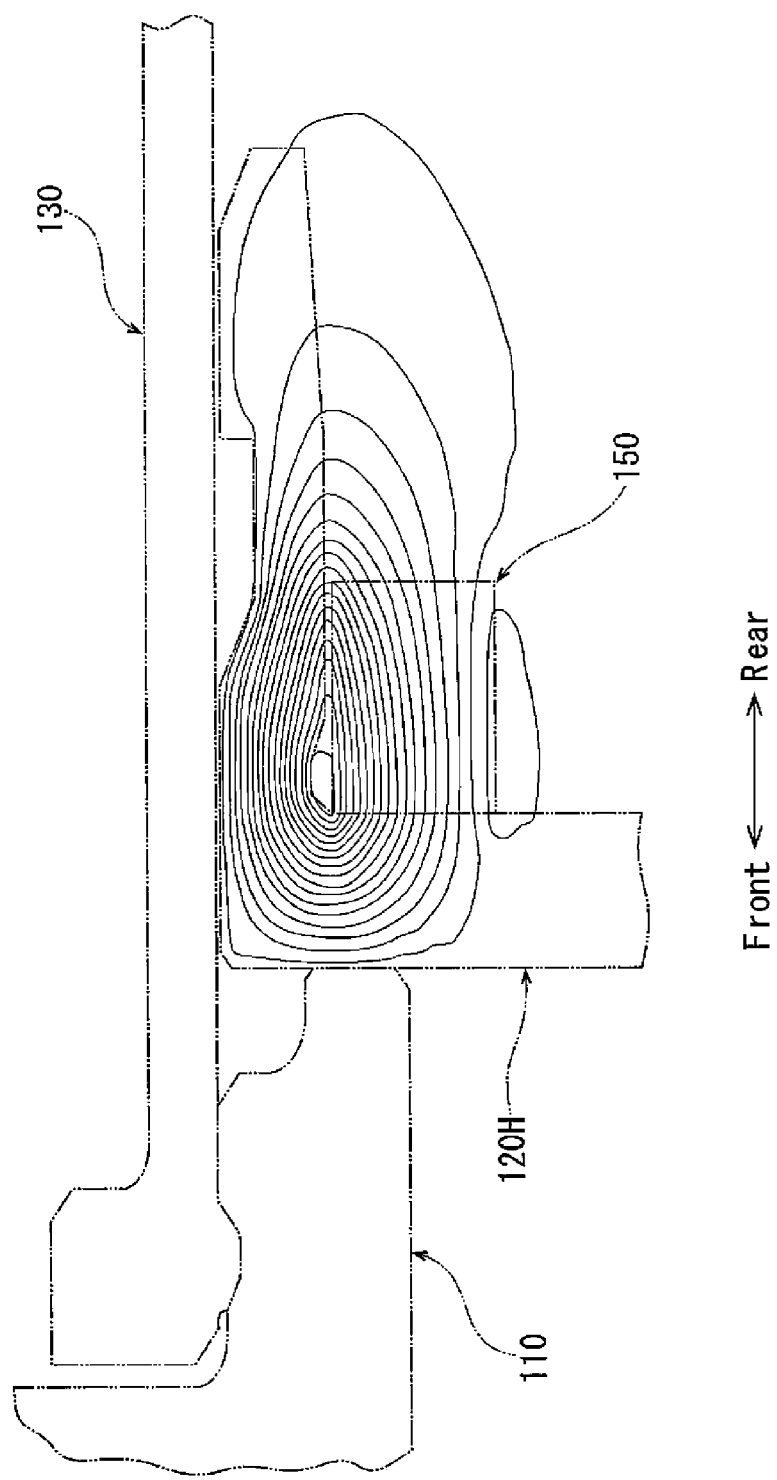
FIG. 5 is a diagram showing magnetic flux lines of the permanent magnet in a differential pressure control valve according to a first comparison example.

On the other hand, FIG. 5 shows a first comparative example. In the first comparative example, the lid 121 made of magnetic material and the guided member 125 made of nonmagnetic material are replaced by a valve body 120H that is formed by integrating a lid and a guided member, and made of magnetic material. In this example, most of the flux of the permanent magnet 150 flows to the valve body 120H, while little of the flux flows to the valve seat 110. Therefore, compared to the case of FIG. 4, the magnetic flux density between the lid 121 and the valve seat 110 is significantly lowered.

Figure 6:
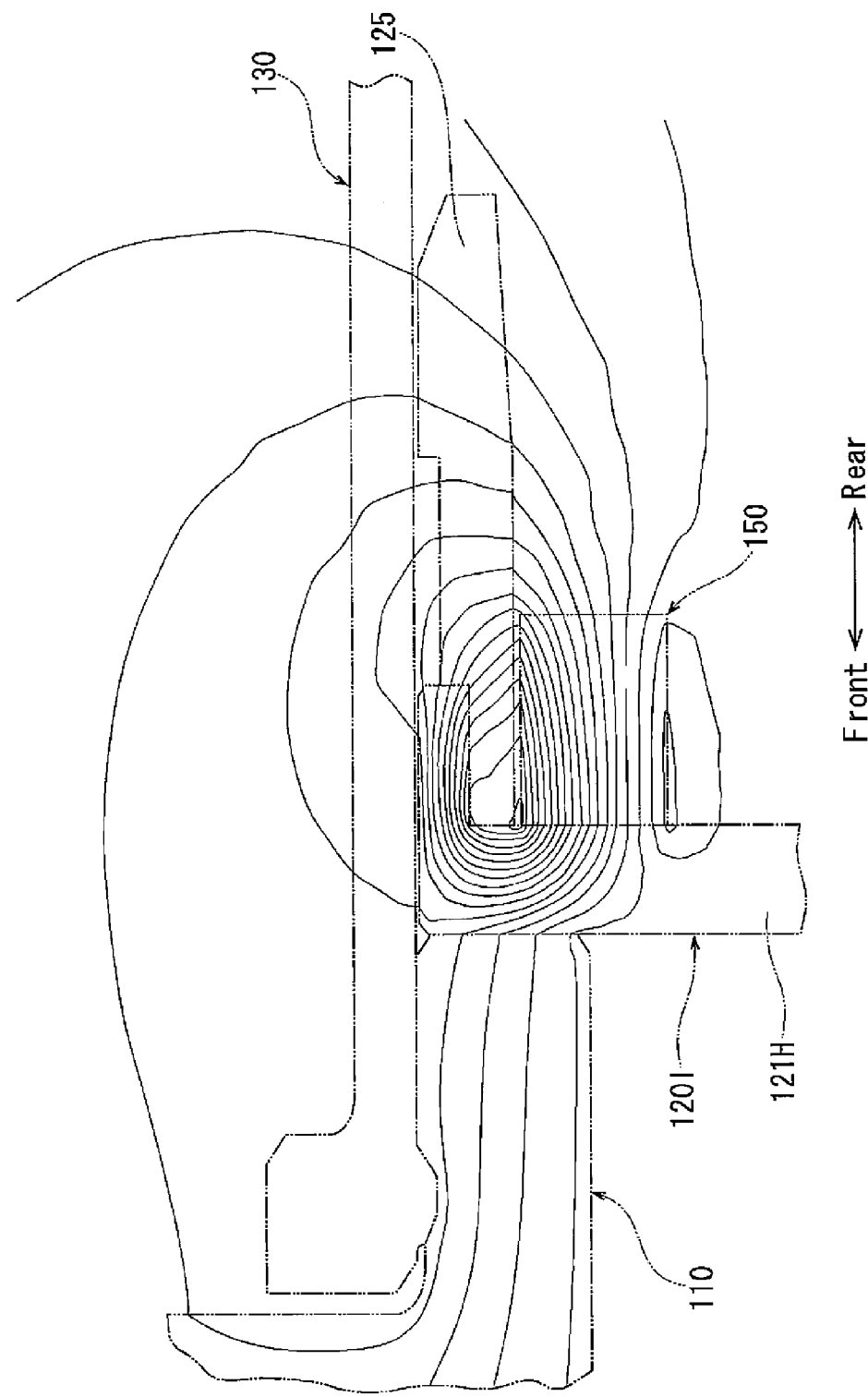
FIG. 6 is a diagram showing magnetic flux lines of the permanent magnet in a differential pressure control valve according to a second comparison example.

FIG. 6 shows a second comparative example. In the second comparative example, a lid 121H made of nonmagnetic material is used in place of the lid 121, which is made of magnetic material. That is, a valve body 120I is entirely made of nonmagnetic material. In this example, since nonmagnetic material is located between the permanent magnet 150 and the valve seat 110, the magnetic flux of the permanent magnet 150 does not smoothly flow to the valve seat 110. Therefore, compared to the case of FIG. 4, the magnetic flux density between the lid 121 and the valve seat 110 is lowered.

As described above, compared to the first and second comparative examples, the magnetic flux density between the lid 121 and the valve seat 110 is higher in the differential pressure control valve 100 of the first embodiment. This allows a great magnetic force to be generated between the lid 121 and the valve seat 110, allowing smooth movement of the valve body 120 toward the valve seat 110, and the valve body 120 to be stably seated on the valve seat 110. Therefore, the size of the permanent magnet 150 is permitted to be further reduced in the differential pressure control valve 100, so that the space required for the permanent magnet 150 can be small. This allows the overall size of the differential pressure control valve 100 to be reduced.

Therefore, the differential pressure control valve 100 of the first embodiment reduces the pressure loss, improves the durability, and reduces its size. The advantageous features of the differential pressure control valve 100 allow pressure loss to be reduced and the durability to be improved in a variable displacement compressor equipped with the differential pressure control valve 100. Also, the size of the compressor can be reduced.

The permanent magnet 150 fixed to the lid 121 can be regarded as a weight that is displaced integrally with the valve body 120. In this respect, the permanent magnet 150 of the present embodiment can be reduced in size to reduce the weight of the valve body 120. Thus, compared to the prior art shown above, the responsiveness of the valve body 120 to the pressure difference between the discharge chamber 5b and the downstream portion of the discharge passage 50 is improved.

In the differential pressure control valve 100 of this embodiment, the guiding member 130 is made of resin, which is nonmagnetic material (for example, nylon resin). Therefore, as shown in FIG. 4, the magnetic flux of the permanent magnet 150 does not smoothly flow from the lid 121 toward the guiding member 130 and the guided member 125, while smoothly flowing from the lid 121 toward the valve seat 110. Thus, the magnetic flux density between the lid 121 and the valve seat 110 is higher in the differential pressure control valve 100 of the first embodiment. This allows a great magnetic force to be generated between the lid 121 and the valve seat 110, allowing smooth movement of the valve body 120 toward the valve seat 110, and the valve body 120 to be stably seated on the valve seat 110. The permanent magnet 150 of the differential pressure control valve 100 can be reduced further in size, and the overall size of the differential pressure control valve 100 is further reduced.

Further, the magnetic pulling force of the permanent magnet 150 is weakened as the valve body 120 is separated further away from the valve seat 110, and the differential pressure control valve 100 has the spring 140, which assists the permanent magnet 150. Therefore, even if the valve body 120 is largely separated from the valve seat 110, and the magnetic pulling force of the permanent magnet 150 is weakened, the spring 140 reliably causes the valve body 120 to be seated on the valve seat 110. Also, since the magnetic flux density is relatively high between the lid 121 and the valve seat 110 in the differential pressure control valve 100, the urging force of the spring 140 does not need to be significantly great. The size of the spring 140 can therefore be reduced. Further, since it is made of nonmagnetic material, the spring 140 reliably urges the valve body 120 toward the valve seat 110 without being influenced by the permanent magnet 150.

The permanent magnet 150 of the differential pressure control valve 100 is coaxial with the valve hole 111 and annular. Therefore, when the valve hole 111 is closed, the permanent magnet 150 approaches the seating face 112 around the valve hole 111, so that the magnetic flux density between the valve body 120 and the valve seat 110 is further increased. Therefore, in the differential pressure control valve 100, the magnetic force acting between the lid 121 and the valve seat 110 is increased, and the size of the permanent magnet 150 can be reduced further. Therefore, the size of the differential pressure control valve 100 is further reduced, and the manufacture costs are further reduced.

Further, in the differential pressure control valve 100, the lid 121 is fitted to the opening 125a with the permanent magnet 150 held by the holding space 125b, so that the permanent magnet 150 is fixed at a position downstream of the lid 121. Therefore, the assembly of the differential pressure control valve 100 is more simplified than in a case where the permanent magnet 150 is fixed to the lid 121, for example, with adhesive. In a case where the permanent magnet 150 is fixed to the lid 121 with adhesive, the adhesive is degraded by high temperature, and the permanent magnet 150 will possibly be separated from the lid 121. In the present embodiment, however, the permanent magnet 150 is not severely influenced by high temperatures. This improves the durability.

(Second Embodiment)

Figure 7:
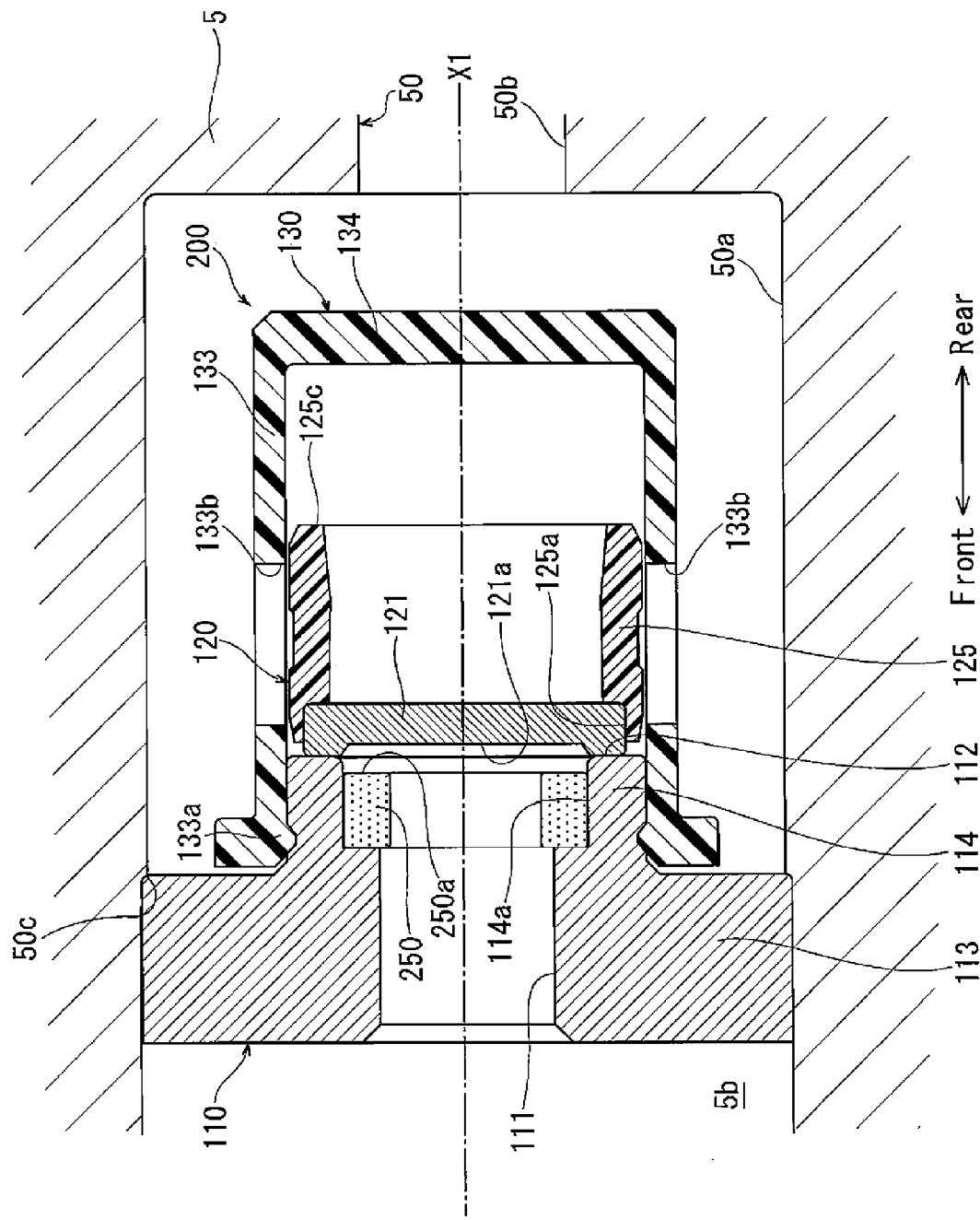
FIG. 7 is a cross-sectional view illustrating a differential pressure control valve according to a second embodiment of the present invention.

As shown in FIG. 7, a differential pressure control valve 200 according to the second embodiment has a permanent magnet 250 fixed to the valve seat 110 in place of the permanent magnet 150 used in the differential pressure control valve 100 of the first embodiment. Also, the spring 140 is omitted. The other structures are the same as the differential pressure control valve 100 according to the first embodiment. Thus, like or the same reference numerals are given to those components that are like or the same as the corresponding components of the first embodiment and detailed explanations are omitted.

A step 114a, which is formed by increasing the diameter of the valve hole 111, is formed at one end of the cylindrical portion 114 that is close to the seating face 112.

An annular permanent magnet 250, the center of which is the axis X1, is attached to the step 114a. The permanent magnet 250 is stuck to the valve seat 110 due to the own magnetic force. The rear facing end face 250a of the permanent magnet 250 is located forward of and separated from the seating face 112. That is, the permanent magnet 250 is installed in a position that is away from the area in which the valve body 120 is seated on or separates from the valve seat 110. The permanent magnet 250 therefore does not contact the lid 121. Also, an escape portion 121a is recessed in the lid 121 to create a large clearance between the lid 121 and the end face 250a of the permanent magnet 250.

The differential pressure control valve 200 is capable of, using the magnetic force acting between the permanent magnet 250 and the lid 121, selectively opening and closing the valve hole 111 by operating in the same manner as the differential pressure control valve 100 of the first embodiment. At this, the differential pressure control valve 200 achieves the same advantages as the differential pressure control valve 100 of the first embodiment.

Also, the differential pressure control valve 200 has no spring that urges the valve body 120 toward the valve seat 110. Thus, the valve body 120 is urged toward the valve seat 110 only by the magnetic pulling force acting between the permanent magnet 250 and the lid 121. This eliminates the necessity for a spring in the differential pressure control valve 200, and reduces the components and simplifies the assembly.

In the differential pressure control valve 200, the permanent magnet 250 is fixed to the valve seat 110 at a position away from the seating face 112 around the valve hole 111. When magnetic foreign material is contained refrigerant gas, such material can be stuck to the permanent magnet 250. At this time, the material is stuck to a part away from the seating face 112, for example, to the end face 250a, the material is prevented from caught onto the seating face 112. If a large foreign object is stuck onto the end face 250a, it is held in the large clearance between the end face 250a and the escape portion 121a, and full closure of the valve hole 111 is not hindered by such a foreign object. As a result, the valve hole 111 is reliably closed in the differential pressure control valve 200.

(Third Embodiment)

Figure 8:
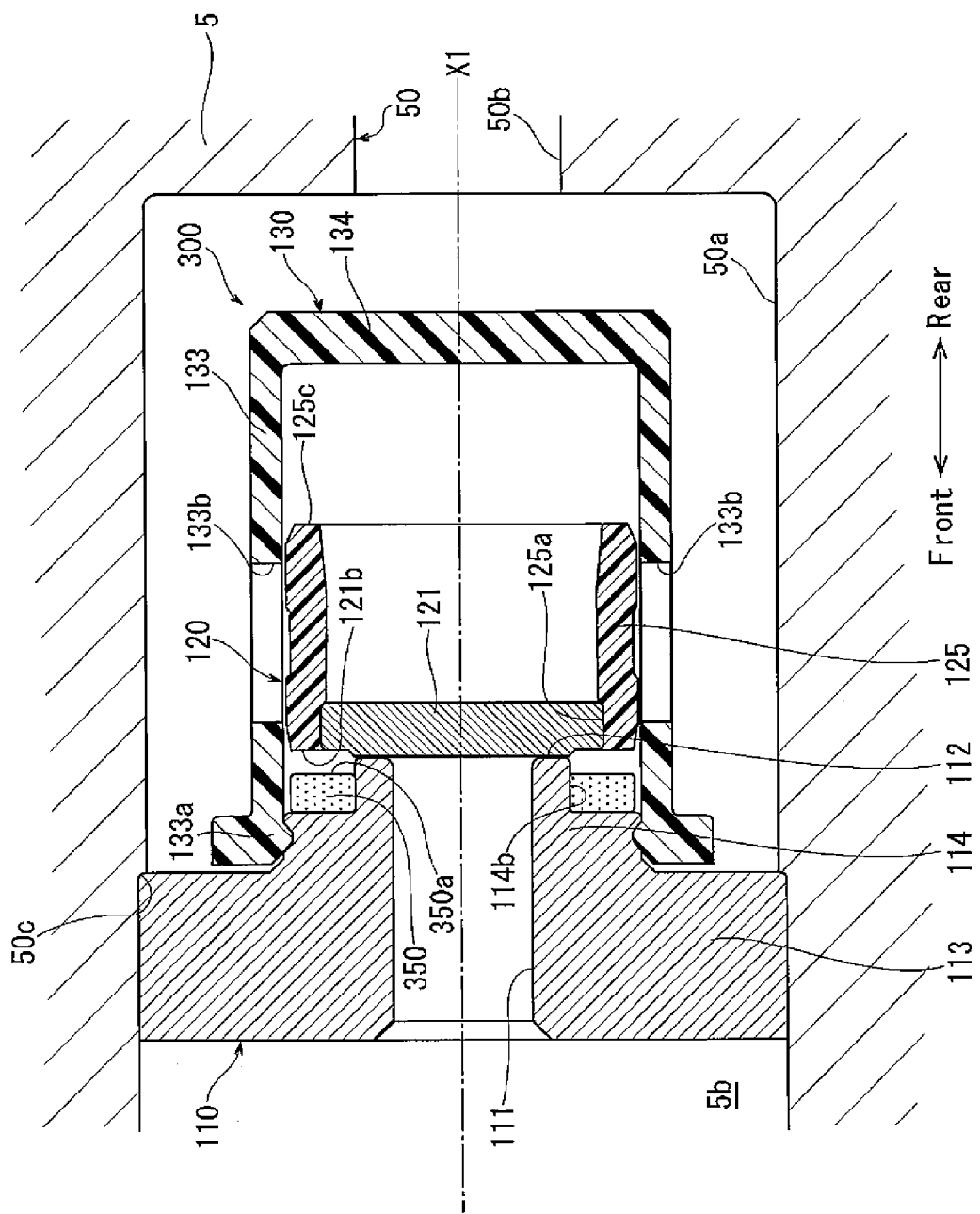
FIG. 8 is a cross-sectional view illustrating a differential pressure control valve according to a third embodiment of the present invention.

As shown in FIG. 8, a differential pressure control valve 300 according to the third embodiment has a permanent magnet 350 fixed to the valve seat 110 in place of the permanent magnet 150 used in the differential pressure control valve 100 of the first embodiment. Also, the spring 140 is omitted. The other structures are the same as the differential pressure control valve 100 according to the first embodiment. Thus, like or the same reference numerals are given to those components that are like or the same as the corresponding components of the first embodiment and detailed explanations are omitted.

A step 114b, which is formed by decreasing the diameter of the outer circumferential surface of the cylindrical portion 114, is formed at one end of the cylindrical portion 114 that is close to the seating face 112.

An annular permanent magnet 350, the center of which is the axis X1, is attached to the step 114b. The permanent magnet 350 is stuck to the valve seat 110 due to the own magnetic force. The rear facing end face 350a of the permanent magnet 350 is located forward of and separated from the seating face 112. That is, the permanent magnet 350 is installed in a position that is away from the area in which the valve body 120 is seated on or separates from the valve seat 110. The permanent magnet 350 therefore does not contact the lid 121. Also, an escape portion 121b is recessed in the lid 121 and the guided member 125 to create a large clearance between the end face 350a of the permanent magnet 350 and a surface defined by the lid 121 and the guided member 125.

The differential pressure control valve 300 is capable of using the magnetic force acting between the permanent magnet 350 and the lid 121 for selectively opening and closing the valve hole 111 by operating in the same manner as the differential pressure control valves 100, 200 of the first and second embodiments.

The difference between the differential pressure control valve 300 of the third embodiment and the differential pressure control valve 200 of the second embodiment is whether or not the permanent magnet 250, 350 is located radially inward of the seating face 112 or radially outward of the seating face 112. Therefore, the differential pressure control valve 300 of the third embodiment has the same advantages as the differential pressure control valve 200 of the second embodiment.

So far, the present invention has been described with reference to the first to third embodiments. However, the present invention is not to be limited to these embodiments, but can be modified within the scope of the invention as follows.

For example, the differential pressure control valves 100, 200, 300 may be arranged vertically, or may be located at a position other than the rear housing member 5.

In the above embodiments, the magnetic material that forms the valve seat 110 and the lid 121 is S45C, which is high-carbon steel. Instead, iron-based material such as chromium molybdenum steel, for example, SCM435 and SCM440, and martensite stainless steel may be used. In the illustrated embodiments, the nonmagnetic material forming the guided member 125 is, for example, nylon resin. However, other resin or aluminum based material may be used.

In the illustrated embodiments, the spring 140 is made of SUS316. However, the spring 140 may be made of nonmagnetic material such as resin or FRP.

In the illustrated embodiments, the permanent magnet 150 is annular and coaxial with the valve hole 111. However, the permanent magnet 150 may be columnar and coaxial with the valve hole 111.

In the above illustrated embodiments, the permanent magnet 150 is a samarium-cobalt magnet. In place of this, (1) a ferrite magnet such as a barium ferrite magnet and a strontium ferrite magnet, (2) a metal magnet such as an alnico magnet and a rare-earth magnet, or (3) a bond magnet such as a rubber magnet and a plastic magnet may be used. As the rare-earth magnet, a neodymium magnet may be used instead of a samarium-cobalt magnet such as a 1-5 series magnet and a 1-17 series magnet. As a rubber magnet, a ferrite rubber magnet or a neodymium rubber magnet may be used. As a plastic magnet, a ferrite plastic magnet or a neodymium plastic magnet may be used.

The permanent magnet 150 may be fixed to the lid 121 or the valve seat 110 using adhesive.

The present invention may be used in an air conditioning apparatus.

What is claimed is:

1. A differential pressure control valve arranged in a variable displacement compressor, wherein the variable displacement compressor comprises a compression chamber and a discharge chamber, the compressor capable of compressing fluid drawing into the compression chamber and discharging the fluid to the discharge chamber, and varying the displacement of the fluid discharged from the compression chamber to the discharge chamber, wherein the differential pressure control valve is arranged in the discharge chamber or in a discharge passage that communicates with the discharge chamber, the differential pressure control valve comprising:

a valve seat having a valve hole through which fluid passes;

a valve body located downstream of the valve seat, the valve body separating from or being seated on the valve seat in accordance with the pressure difference between an upstream side and a downstream side, thereby opening or closing the valve hole; and a guiding member made of nonmagnetic material and fixed to the valve seat to guide the valve body, wherein the valve seat is made of magnetic material, the valve body has a lid made of magnetic material and a guided member made of nonmagnetic material, the lid being seatable on the valve seat to close the valve hole, and the guided member being guided by the guiding member, the guided member shaped as a hollow cylinder, and the lid fitted into an opening of the hollow cylinder to contact an inner circumferential surface of the hollow cylinder, wherein the inner circumferential surface of the hollow cylinder extends from the opening of the hollow cylinder at a front end of the guided member to another opening of the hollow cylinder at the rear end of the guided member, one of the valve seat and the lid has a permanent magnet, the valve body being urged in the direction approaching the valve seat by the magnetic pulling force of the permanent magnet, the permanent magnet is located at a position outside an area in which the valve body is seated on the valve seat, and the valve seat has a flat face, the lid has a flat face, the flat face of the valve seat contacts the flat face of the lid, and both the flat face of the valve seat and the flat face of the lid are made of magnetic material.

2. The differential pressure control valve according to claim 1, further comprising a spring for urging the valve body toward the valve seat.

3. The differential pressure control valve according to claim 1, wherein the permanent magnet is annular and coaxial with the valve hole.

4. The differential pressure control valve according to claim 3, wherein the permanent magnet is fixed to the valve seat at a position away from a seating face around the valve hole.

5. The differential pressure control valve according to claim 1, wherein the permanent magnet is located at a position on the opposite side of the lid in relation to the valve seat.

6. The differential pressure control valve according to claim 1, wherein the permanent magnet is a samarium-cobalt magnet.

7. The differential pressure control valve according to claim 1, wherein the permanent magnet is located at a position outside an area in which the fluid flows.

* * * * *